(12) United States Patent
Huang et al.

(10) Patent No.: US 10,726,753 B2
(45) Date of Patent: Jul. 28, 2020

(54) ARRAY SUBSTRATE AND ARRAY SUBSTRATE TESTING STRUCTURE

(71) Applicant: Wuhan China Star Optoelectronics Technology Co., Ltd., Wuhan, Hubei (CN)

(72) Inventors: Yao-li Huang, Guangdong (CN); Xinglong He, Guangdong (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 249 days.

(21) Appl. No.: 15/748,852

(22) PCT Filed: Dec. 5, 2017

(86) PCT No.: PCT/CN2017/114601
§ 371 (c)(1),
(2) Date: Jan. 30, 2018

(87) PCT Pub. No.: WO2019/061815
PCT Pub. Date: Apr. 4, 2019

(65) Prior Publication Data
US 2019/0385497 A1  Dec. 19, 2019

(30) Foreign Application Priority Data
Sep. 26, 2017  (CN) .......................... 2017 1 0879966

(51) Int. Cl.
*G09G 3/00* (2006.01)
*G02F 1/1362* (2006.01)

(52) U.S. Cl.
CPC ....... *G09G 3/006* (2013.01); *G02F 1/136259* (2013.01)

(58) Field of Classification Search
CPC .... G09G 3/006; G09G 3/20; G02F 1/136259; G02F 1/1309; G02F 1/3338; G02F 2203/69; G06F 3/0412; H04M 1/03; H04M 1/0266; H04M 1/24; H04M 2250/22
USPC ...................................... 324/760.01
See application file for complete search history.

(56) References Cited

U.S. PATENT DOCUMENTS

| | | | | |
|---|---|---|---|---|
| 2008/0030668 | A1* | 2/2008 | Komaju | G02F 1/1345 349/151 |
| 2012/0105085 | A1* | 5/2012 | Chen | G02F 1/1309 324/693 |

FOREIGN PATENT DOCUMENTS

| | | |
|---|---|---|
| CN | 101276526 A | 10/2008 |
| CN | 102122478 A | 7/2011 |
| CN | 105632382 U | 6/2016 |
| CN | 105954899 A | 9/2016 |
| CN | 106990630 A | 7/2017 |

(Continued)

*Primary Examiner* — Melissa J Koval
*Assistant Examiner* — Courtney G. McDonnough
(74) *Attorney, Agent, or Firm* — Hemisphere Law, PLLC; Zhigang Ma

(57) ABSTRACT

An array substrate and an array substrate testing structure are provided. The array substrate includes a display region and a non-display region, a plurality of receiving test signal pins, a plurality of bonding pins and a plurality of transmission lines are positioned on the non-display region, the receiving test signal pins and the transmission lines are arranged in row. This invention decreases width of non-display region of electrical device such that easily to design the narrow frame.

9 Claims, 7 Drawing Sheets

(56) References Cited

FOREIGN PATENT DOCUMENTS

| | | | |
|---|---|---|---|
| JP | 2007292750 | A | 11/2007 |
| JP | 20080046384 | A | 2/2008 |
| KR | 20060075173 | A | 7/2006 |

\* cited by examiner

ARRAY SUBSTRATE AND ARRAY SUBSTRATE TESTING STRUCTURE

RELATED APPLICATIONS

The present application is a National Phase of International Application Number PCT/CN2017/114601, filed Dec. 5, 2017, and claims the priority of China Application No. 201710879966.0, filed Sep. 26, 2017.

FIELD OF THE DISCLOSURE

The disclosure relates to a touch panel technical field, and more particularly to an array substrate and an array substrate testing structure.

BACKGROUND

With development of science technology, more and more electric device has display function are widely use for daily life and work and bring huge convinces, therefore the electric device has display function become an indispensable and important tool of life. The electric device usually includes array substrate. The array substrate includes non-display region and display region. The display region usually positioned functional circuit for driving electric device to work for example touch electrode. The non-display region is positioned around the display region, and usually positioned testing pins. The manufacturing of electric device is to cell, package the array substrate, liquid crystal layer and color filter substrate. Generally, it needs to testing short circuit or broken circuit of the functional circuit of the array substrate after or before the cell process. In order to test the array substrate, positioning the testing switch circuit and testing signal outputting terminal on outputting pin of the non-display region of the array substrate for testing whether the array substrate functional circuit is short circuit or broken circuit in the traditional way. For connivance positioning the probe, the volume of testing signal inputting terminal usually more big (single terminal 400 um×400 um, totally have 10-20 terminals), it will occupy more space and not benefiting to narrow frame of electric device.

SUMMARY

Furthermore, the disclosure further provides an array substrate includes a display region and a non-display region, a plurality of receiving test signal pins, a plurality of bonding pins and a plurality of transmission lines are positioned on the non-display region, the receiving test signal pins and the bonding pins are arranged in row.

In an embodiment, size of the bonding pins signal pins are equal to size of the transmission lines.

In an embodiment, the bonding pins for connecting to a COF module, the transmission lines are connecting to a test circuit and the receiving test signal pins, plurality of receiving test signal pins are receiving N test signals and transmitting the N test signals to the test circuit from the test signal transmission lines, the test circuit is positioned on a side of the non-display region which nearby the display region for obtaining M test signals according to the N test signals, and transmitting the M test signals to a functional circuit in the display region for examining whether the functional circuit is short circuit or broken circuit, distance between the test circuit and a side of the non-display region which far away the display region is less than or equal to a preset distance, wherein, N and M are positive integers and M is larger than N.

In an embodiment, the receiving test signal pins are positioned beside the bonding pins, the receiving test signal pins and the bonding pins are linearly arranged in row.

In an embodiment, a position strip is positioned in interval region between the bonding pins and the receiving test signal pins, for positioning a testing device, wherein, the testing device for generating N test signals.

In an embodiment, the position strip is metal material, and the position strip as a ground terminal of the bonding pins and the receiving test signal pins.

In an embodiment, a fixing element is positioned on a side of the position strip which nearby the receiving test signal pins, and the fixing element is for fixing the testing device.

According to another aspect of the disclosure, the disclosure further provides an array substrate testing structure, comprising a testing device and an array substrate, the testing device for generating N test signals, the array substrate includes a display region and a non-display region, a plurality of receiving test signal pins, a plurality of bonding pins and a plurality of transmission lines are positioned on the non-display region, the receiving test signal pins and the bonding pins are arranged in row, wherein N is positive integer.

In an embodiment, the receiving test signal pins are positioned beside the bonding pins, the receiving test signal pins and the bonding pins are linearly arranged in row.

In an embodiment, a position strip is positioned in interval region between the bonding pins and the receiving test signal pins, for positioning a testing device.

According to another aspect of the disclosure, the disclosure further provides a touch screen. The touch screen includes the array substrate as described above.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The disclosure will be further described in detail with reference to accompanying drawings and preferred embodiments as follows.

Figure 1:
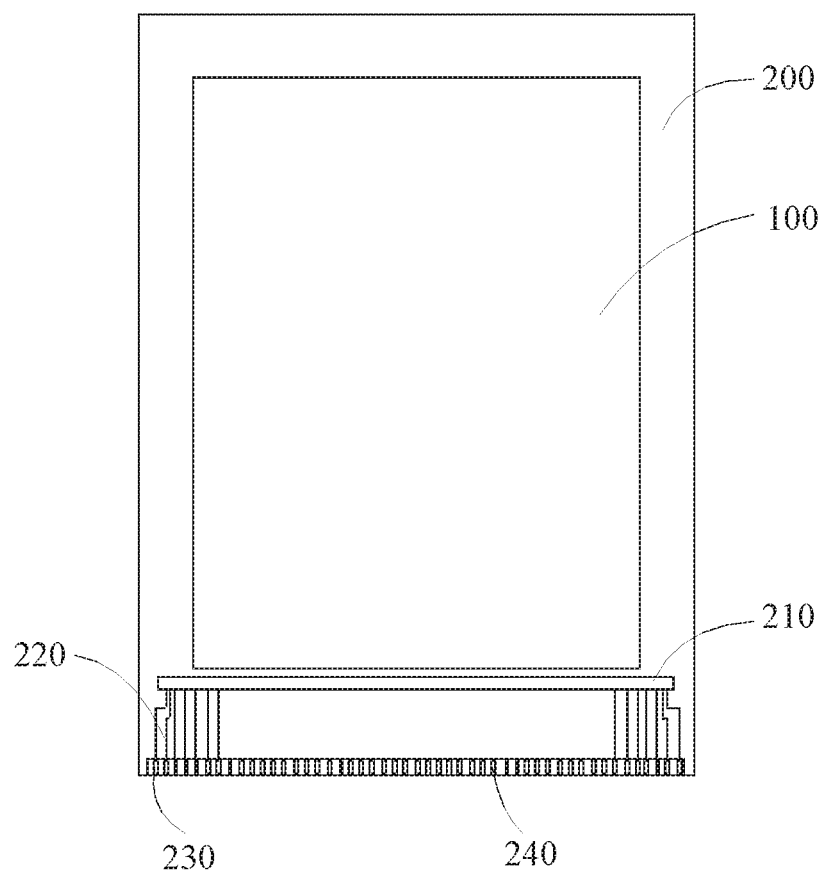
FIG. 1 is a structural schematic view of an array substrate according to an embodiment of the disclosure.

Please refer to FIG. 1. FIG. 1 is a structural schematic view of an array substrate according to an embodiment of the disclosure. The array substrate 10 includes a display region 100 and a non-display region 200. The display region positioning a functional circuit, the functional circuit is for driving touch screen. The functional circuit could be a touch electrode wire, a scan line, a signal wire, a common electrode wire or other wire which positioned on the touch screen, but not limited thereto. The non-display region 200 is positioned surrounding the display region 100, a plurality of receiving test signal pins 230, a plurality of bonding pins 240, a plurality of transmission lines 220 and the testing circuit 210 are positioned on the non-display region 200. The receiving test signal pins 230 and the bonding pins 240 are arranged in row and has same size, and the receiving test signal pins 230 and the bonding pins 240 are positioned on a side of the non-display region 200 which far away the display region 100. The bonding pins 240 for connecting to a COF (Chip on FPC) module. The test signal transmission lines 220 are electrically connecting to a test circuit 210 and the receiving test signal pins 230. The plurality of receiving test signal pins 230 are use for receiving N test signals and transmitting the N test signals to the test circuit 210 from the test signal transmission lines 220. The test circuit 210 is positioned on a side of the non-display region 200 which nearby the display region 100 for obtaining M test signals according to the N test signals, and transmitting the M test signals to the functional circuit in the display region 200 for examining whether the functional circuit is short circuit or broken circuit. The distance between the test circuit 210 and a side of the non-display region 200 which far away the display region 100 is less than or equal to a preset distance. Wherein, N and M are positive integers and M is larger than N.

The COF module which is using the COP technology to made a module which perparing the Integrated Circuit (IC) on the Flexible Printed Circuit (FPC). The IC could be a data chip, a timing controller (TCON), a scan data chip and so on, but here is not limited thereto.

Wherein, the distance between the test circuit 210 and a side of the non-display region 200 which far away the display region 100 is less than or equal to a preset distance.

In the existing technology, multiple outside testing signals are respectively positioned on multiple receiving terminals on the non-display region and transmitting to the panel. But size of each regular receiving terminals are too big, and could not used for connecting and arranged side by side with the bonding pins, such that the regular receiving terminal only could interleaved positioned on two sides of the bonding pins, and it enlarger width of frame and not benefits for narrow frame trend. Therefore, this disclosure improving the bigger test signal receiving terminals in the existing technology to a pin structure which has similar size to the bonding pins 240. Because of narrow the size of testing signal receiving terminal obviously, the receiving test signal pins 230 and the bonding pins 240 could arranged in a row, and reduces width of non-display region panel.

Preferably, the size of the receiving test signal pins 230 are substantially equal to size of the bonding pins 240 for in line with process consistency. The size of the bonding pins 240 is a regular pin size for connecting COF on panel.

It could be noted that, consider to the manufacture tolerance, size of the receiving test signal pins 230 might be slightly larger than or slightly smaller than the size of the bonding pins 240 in effective accuracy range. Therefore, it still belongs to the same size of the receiving test signal pins 230 and the bonding pins 240 defined in this disclosure.

It could be noted that, if size of the receiving test signal pins 230 is slightly larger than or slightly smaller than the size of the bonding pins 240, still could achieve that arranged in row with the bonding pins in this disclosure, and fever to design of narrow frame. It meets the principle of improvement of this invention.

The array substrate 10 of the embodiment in this invention, which is linearly arranged the receiving test signal pins 230 and the bonding pins 240 in row, and the receiving test signal pins 230 is positioned a side of the non-display region 200 which far away the display region 100. According to rearrange the receiving test signal pins 230 and the bonding pins 240 made structure of the non-display region 200 more compact. It is beneficial to design of the narrow frame for touch screen.

Figure 2:
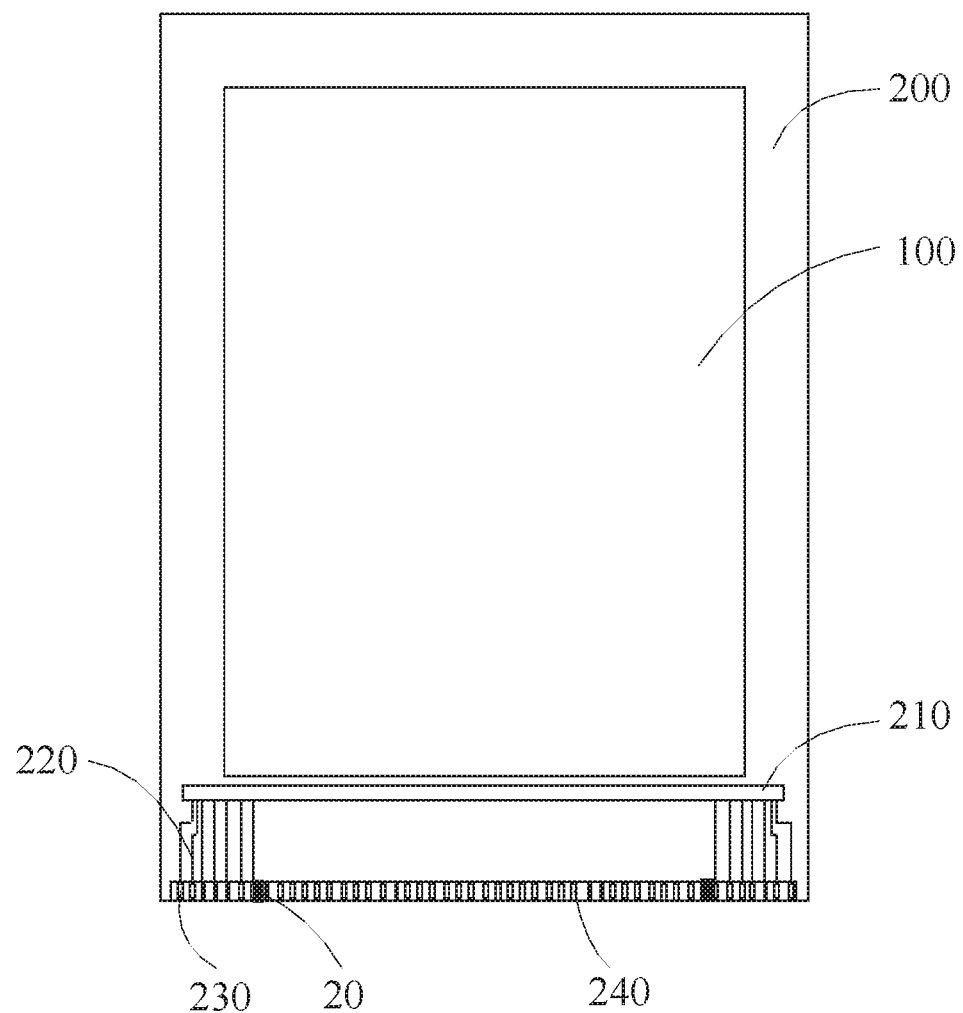
FIG. 2 is a structural schematic view of an array substrate according to another embodiment of the disclosure.

Please refer to FIG. 2. FIG. 2 is a structural schematic view of an array substrate according to another embodiment of the disclosure. The receiving test signal pins 230 are positioned beside the bonding pins 240, and the receiving test signal pins 230 and the bonding pins 240 are linearly arranged in row. More precisely, the receiving test signal pins 230 are positioned on right side and left side of the bonding pins 240. A position strip 20 is positioned in interval region which is between the bonding pins 240 and the receiving test signal pins 230, for positioning a testing device. Wherein, the testing device for generating N test signals. The position strip 20 is metal material, and the position strip 20 is commonly used to be a ground terminal of the bonding pins 240 and the receiving test signal pins 230.

Wherein, the position strip 20 is metal material, and the position strip 20 is positioned on interval region which is between the bonding pins 240 and the receiving test signal pins 230. On one hand, the function of the position strip 20 is to label position on the testing device; on the other hand, the position strip 20 is commonly used to be a ground terminal of the bonding pins 240 and the receiving test signal pins 230. The position strip 20 could be a tiny metal strip, and also could be a metal sheet which has a special label. The position strip 20 could including the above example, but not limited thereto. During the applied process, the position strip 20 maybe two or more than two, and it does not be limited.

The array substrate provides by this embodiment in this disclosure, according to position the position strip 20 has metal material on interval region which is between the bonding pins 240 and the receiving test signal pins 230. For one hand, the function of the position strip 20 is to label position on the testing device, avoids situation of that the testing device connecting to wrong site; on the other hand, the position strip 20 is commonly used to be a ground terminal of the bonding pins 240 and the receiving test signal pins 230, which is for saving space of non-display region. It is beneficial to design of the narrow frame for touch screen.

Figure 3:
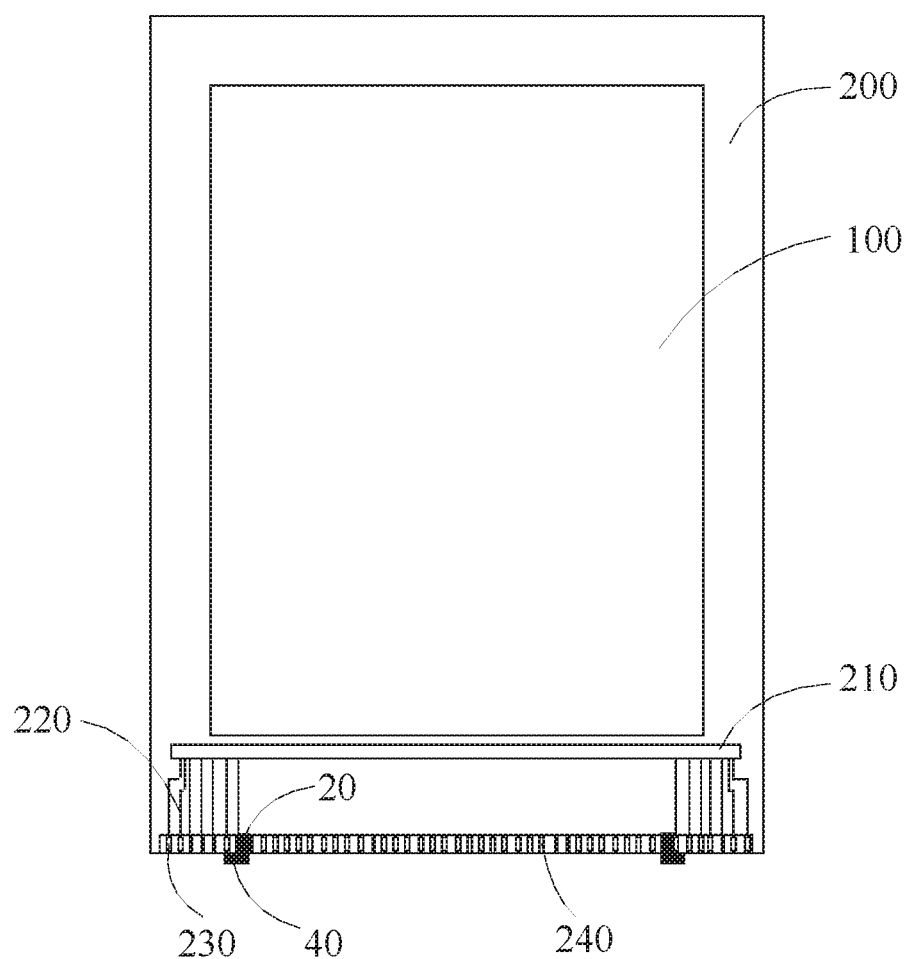
FIG. 3 is a structural schematic view of an array substrate according to yet another embodiment of the disclosure.

Please refer to FIG. 3. FIG. 3 is a structural schematic view of an array substrate according to yet another embodiment of the disclosure. In this embodiment, a position strip 20 is positioned in interval region which is between the bonding pins 240 and the receiving test signal pins 230, for positioning a testing device. Wherein, the testing device for generating N test signals. A fixing element 40 is positioned on a side of the position strip 20 which nearby the receiving test signal pins 230, and the fixing element 40 is use for fixing the testing device.

In an embodiment, the fixing element 40 is a structure has groove, the groove is positioned on top side of the position strip 20 or positioned nearby a lateral side of the receiving test signal pins 230. At this time, an outputting portion of the outputting testing signal of the testing device is embedded into the groove of the fixing element 40, such that fixing the testing device. In another embodiment, the fixing element 40 is a spring sheet, the spring sheet is positioned on top side of the position strip 20 or positioned nearby a lateral side of the receiving test signal pins 230. According to elastic force from the spring sheet, the outputting portion of the outputting testing signal of the testing device is press fit with the receiving test signal pins 230 for preventing the testing device fixture off. The structure of fixing element 40 is not limited thereto. The position strip 20 and the fixing element 40 could be integrated together, and also could be two independent structures. In the specifically application, the position strip 20 could be design to two or more, but not limited; the fixing element 40 could be design to two or more, but not limited.

The array substrate provides by this embodiment in this disclosure, according to position the position strip 20 on interval region which is between the bonding pins 240 and the receiving test signal pins 230, and the fixing element 40 is positioned on a side of the position strip 20 which nearby the receiving test signal pins 230. The function of the position strip 20 is to label position on the testing device, avoids situation of that the testing device connecting to wrong site. Further, the fixing element 40 is used for fixing the testing device, preventing the testing device drops during the testing process.

Figure 4:
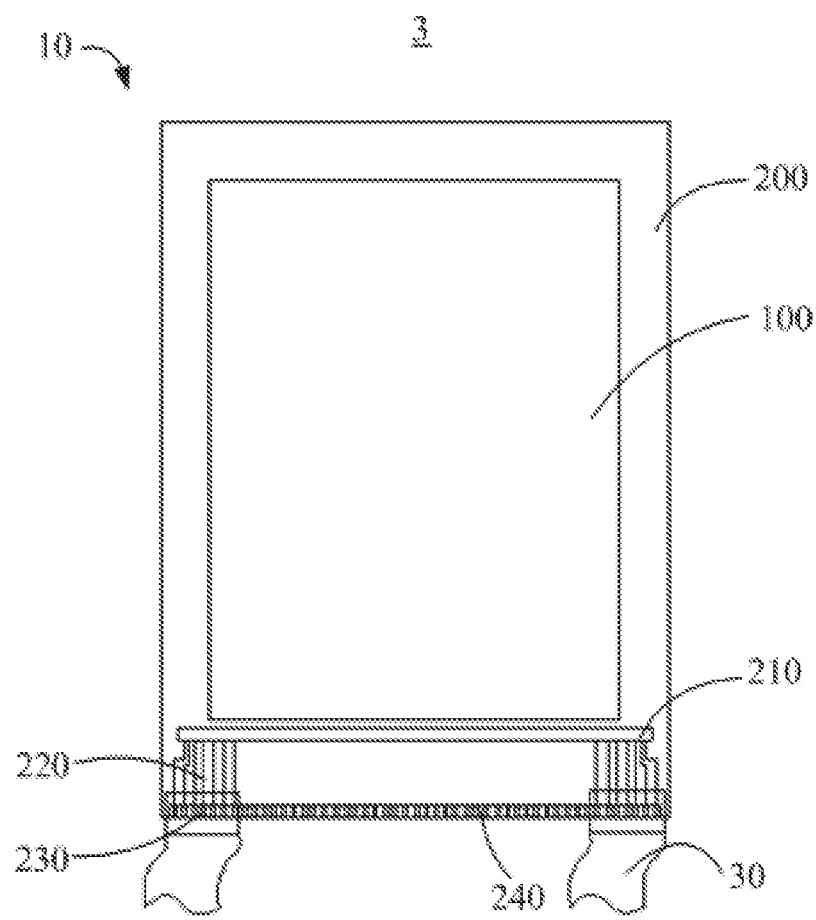
FIG. 4 is a structural schematic view of an array substrate testing structure according to an embodiment of the disclosure.
Figure 5:
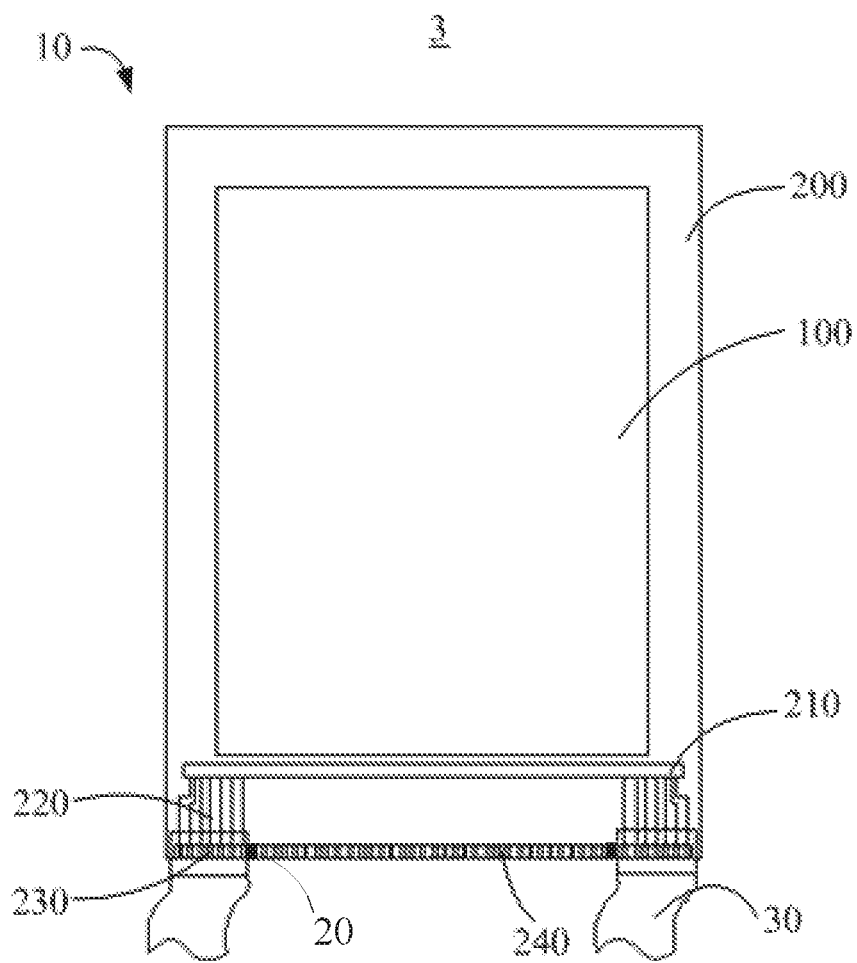
FIG. 5 is a structural schematic view of an array substrate testing structure according to another embodiment of the disclosure.
Figure 6:
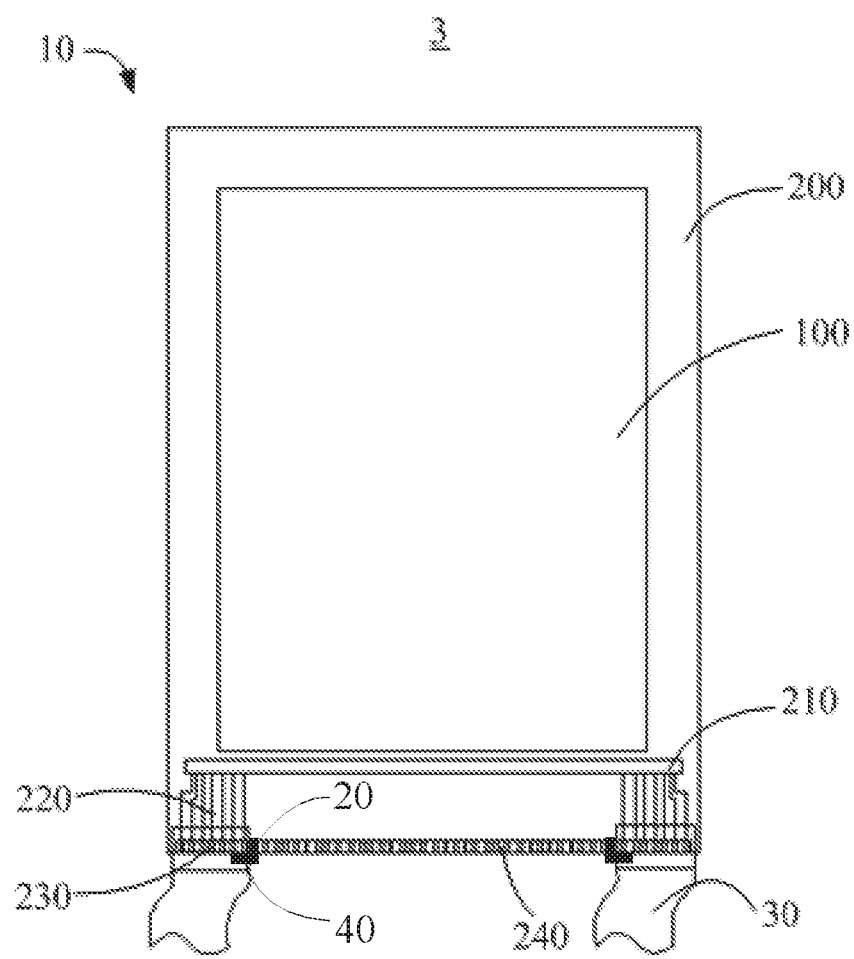
FIG. 6 is a structural schematic view of an array substrate testing structure according to yet another embodiment of the disclosure.

An array substrate testing structure 3 provides by this embodiment in this disclosure, please refer to the FIG. 4 to FIG. 6. The array substrate testing structure 3 comprises a testing device 30 and an array substrate 10. The testing device 30 is used for generating N test signals, the array substrate 10 could be any array substrate provides by above embodiment. Here is not repeated again.

Figure 7:
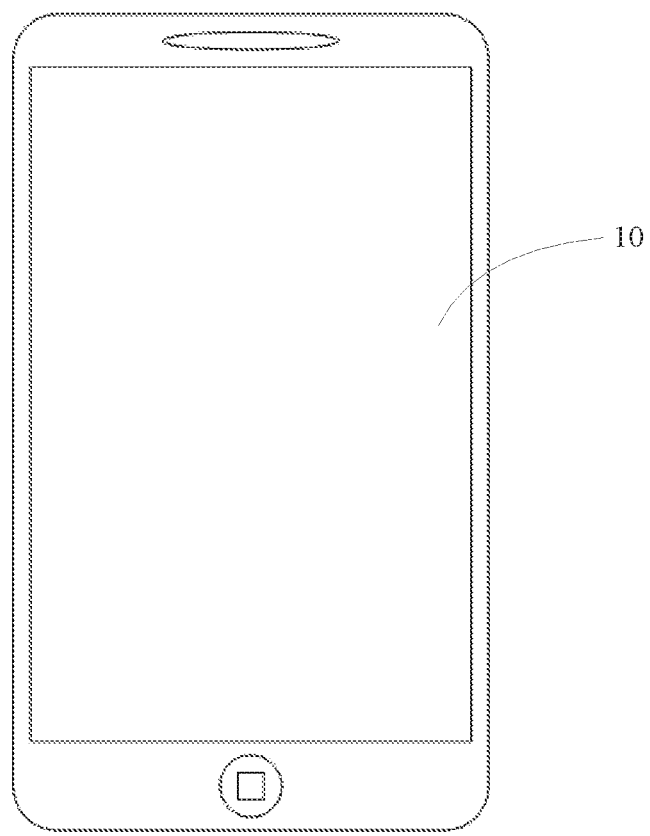
FIG. 7 is a structural schematic view of a touch screen according to an embodiment of the disclosure.

Please refer to FIG. 7. FIG. 7 is a structural schematic view of a touch screen according to an embodiment of the disclosure. The touch screen 1 comprises an array substrate 10, the array substrate 10 could be any array substrate provides by above embodiment. Here is not repeated again. The touch screen 1 could be but not limited by electrical book, smart phone (such Android cell phone, iOS cell phone, Windows Phone), table, PDA, notebook, Mobile Internet Devices (MID) or wearing device and so on.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. An array substrate, wherein, the array substrate includes a display region and a non-display region, a plurality of receiving test signal pins, a plurality of bonding pins and a plurality of transmission lines are positioned on the non-display region, the receiving test signal pins and the bonding pins are arranged in row, wherein the bonding pins are connected to a COF module, the transmission lines are connected to a test circuit and the receiving test signal pins, the receiving test signal pins receive N test signals and transmitting the N test signals to the test circuit from the test signal transmission lines, the test circuit is positioned on a side of the non-display region which is nearby the display region for obtaining M test signals according to the N test signals, and transmitting the M test signals to a functional circuit in the display region for examining whether the functional circuit is short circuit or broken circuit, and the distance between the test circuit and a side of the non-display region which is further away from the display region is less than or equal to a preset distance, wherein, N and M are positive integers and M is larger than N.

2. The array substrate according to claim 1, wherein size of the receiving test signal pins are equal to size of the bonding pins.

3. The array substrate according to claim 1, wherein the receiving test signal pins are positioned beside the bonding pins, the receiving test signal pins and the bonding pins are linearly arranged in row.

4. The array substrate according to claim 1, wherein a position strip is positioned in interval region between the bonding pins and the receiving test signal pins, for positioning a testing device, wherein, the testing device generates the N test signals.

5. The array substrate according to claim 4, wherein the position strip is metal material, and the position strip as a ground terminal of the bonding pins and the receiving test signal pins.

6. The array substrate according to claim 4, wherein a fixing element is positioned on a side of the position strip which nearby the receiving test signal pins, and the fixing element is for fixing the testing device.

7. An array substrate testing structure, comprising a testing device and an array substrate, the testing device for generating N test signals, the array substrate includes a display region and a non-display region, a plurality of receiving test signal pins, a plurality of bonding pins and a plurality of transmission lines are positioned on the non-display region, the receiving test signal pins and the bonding pins are arranged in row, wherein N is positive integer, wherein the bonding pins are connected to a COF module, the transmission lines are connected to a test circuit and the receiving test signal pins, the receiving test signal pins receive the N test signals and transmitting the N test signals to the test circuit from the test signal transmission lines, the test circuit is positioned on a side of the non-display region which is nearby the display region for obtaining M test signals according to the N test signals, and transmitting the M test signals to a functional circuit in the display region for examining whether the functional circuit is short circuit or broken circuit, and distance between the test circuit and a side of the non-display region which is further away from the display region is less than or equal to a preset distance, wherein, M is positive integer and M is larger than N.

8. The array substrate testing structure according to claim 7, wherein the receiving test signal pins are positioned beside the bonding pins, the receiving test signal pins and the bonding pins are linearly arranged in row.

9. The array substrate testing structure according to claim 7, wherein a position strip is positioned in interval region between the bonding pins and the receiving test signal pins, for positioning a testing device.

\* \* \* \* \*